(No Model.)
F. A. LAVERCOMBE.
ADJUSTABLE LIGHT.
No. 587,151. Patented July 27, 1897.
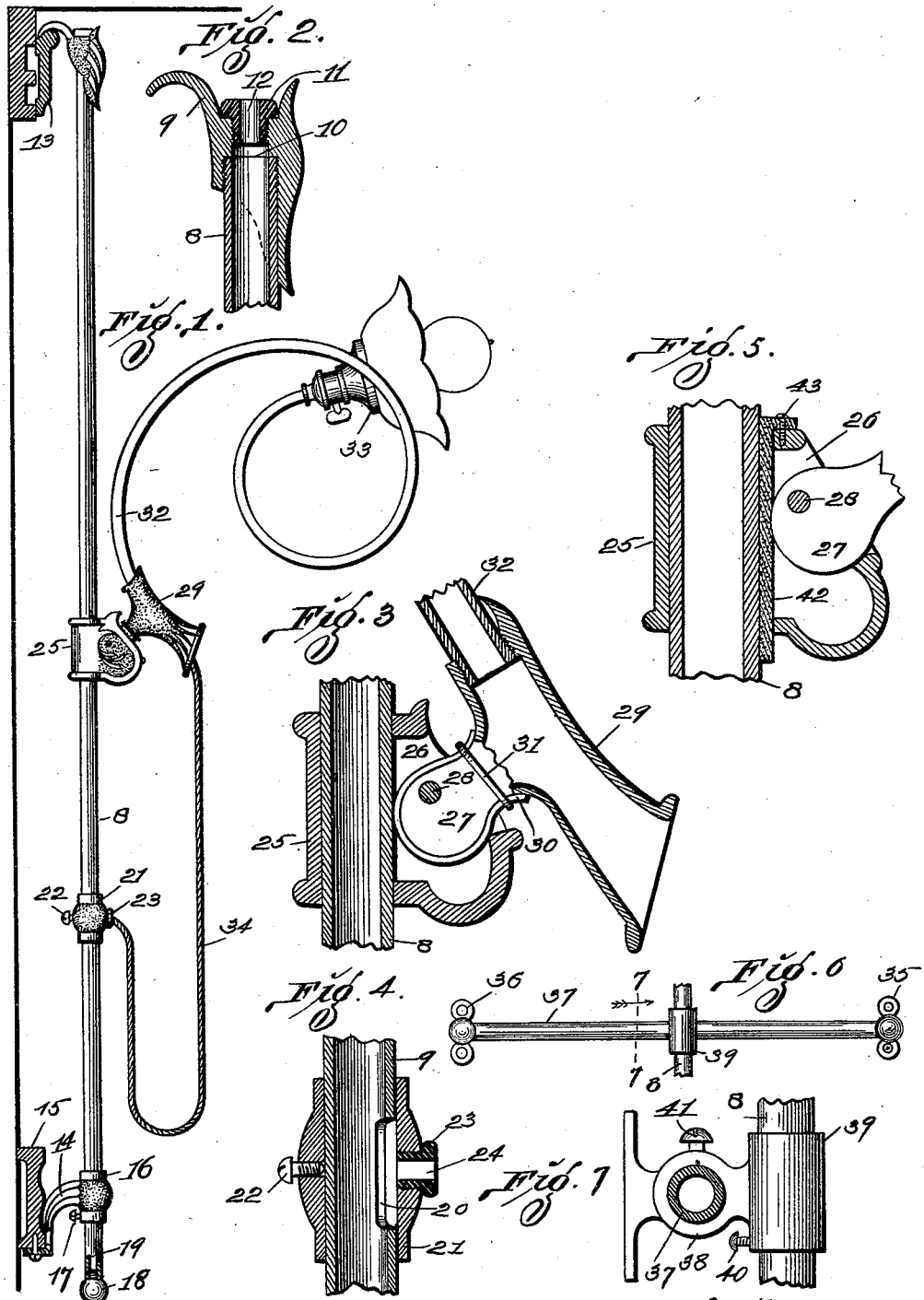
Attest:
M. Smith
S. G. Wells
Inventor:
F. A. Lavercombe
By Higdon, Longan & Higdon
ATTYS.

UNITED STATES PATENT OFFICE.

FREDERICK A. LAVERCOMBE, OF ST. LOUIS, MISSOURI, ASSIGNOR TO SOPHIA LAVERCOMBE, OF SAME PLACE.

ADJUSTABLE LIGHT.

SPECIFICATION forming part of Letters Patent No. 587,151, dated July 27, 1897.

Application filed March 8, 1897. Serial No. 626,485. (No model.)

*To all whom it may concern:*

Be it known that I, FREDERICK A. LAVERCOMBE, of the city of St. Louis, State of Missouri, have invented certain new and useful Improvements in Adjustable Lights, of which the following is a full, clear, and exact description, reference being had to the accompanying drawings, forming a part hereof.

My invention relates to adjustable lights; and it consists of the novel construction, combination, and arrangement of parts hereinafter shown, described, and claimed.

Figure 1 is a side elevation of an adjustable light constructed in accordance with the principles of my invention in position upon the wall of a room, the chair-rail and the picture-rail of the wall being shown in section. Fig. 2 is an enlarged detail sectional view of the upper end of the pipe shown in Fig. 1 and of the casting which secures said pipe to the picture-rail. Fig. 3 is an enlarged detail sectional elevation showing the sliding connection which renders the light adjustable. Fig. 4 is an enlarged detail sectional elevation of the pipe shown in Fig. 1 and illustrating the means of insulating the electric conductor from said pipe and of passing said conductor into said pipe. Fig. 5 is a modification of Fig. 3. Fig. 6 is a front elevation of a horizontal rod which may be used in place of the chair-rail shown in Fig. 1. Fig. 7 is a cross-section taken approximately on the line 7 7 of Fig. 6 and looking in the direction indicated by the arrow.

In the construction of an adjustable light in accordance with the principles of my present invention I employ the vertical pipe 8, the upper end of which is exteriorly screw-threaded and the lower end of which is interiorly screw-threaded. The upper end of the pipe 8 is screw-seated in the casting, from which projects the hook 9. A vertical bore 10 is formed through the casting and registers with the bore in the pipe 8, and the rubber plug 11 is screw-seated in said bore 10 and has the vertical bore 12, which registers with the bore 10. The hook 9 engages the picture-rail 13, which is attached to the wall of the room.

A bracket 14 is attached to the chair-rail 15 of the wall of the room, and a vertical bearing 16 is formed in the free end of said bracket to receive the lower end of the pipe 8, and said pipe is held in position in said bearing 16 by means of the set-screw 17. The spherical body 18 has an exteriorly-screw-threaded projection 19, which is screw-seated in the lower end of the pipe 8 for ornamental purposes.

A slot 20 is formed in the pipe 8 near its lower end, and the collar 21 is placed upon the pipe 8 and secured in position over said slot 20 by means of the set-screw 22. An interiorly-screw-threaded bore is formed horizontally through one side of the collar 21 and communicates with the slot 20, and the rubber plug 23 is screw-seated in said bore, said plug 23 having the bore 24 communicating with the slot 20 and the interior of the pipe 8. The block 25 is slidingly mounted upon the pipe 8 above the collar 21, and a horizontal opening 26 is formed in one side of said block. The lever 27 is pivotally mounted in the opening 26 by means of the pin 28, and the inner end of said lever 27 engages the pipe 8 when said inner end is elevated and disengages said pipe when said inner end is depressed.

The tube 29 is formed integral with and extends transversely of the outer end of said lever 27. A strip of rubber 30 or other suitable yielding material is placed around the inner end of the lever 27 in position to form a cushion between said lever and the pipe 8, and said cushion is held in position by means of the band 31, encircling the outer end of the lever 27 and the ends of the cushion 30. One end of the pipe 32 is screw-seated in the upper end of the tube 29, and upon the opposite end of said pipe is an electric burner 33. The electric-light conductor is passed downwardly through the opening 12 in the rubber block 11 and downwardly through the pipe 8 and outwardly through the slot 20, through the opening 24 in the rubber block 23, then upwardly through the tube 29, and then through the pipe 32 to the burner 33. It is essential that the portion 34 of the conductor which connects the rubber block 23 with the tube 29 should be flexible, as shown in Fig. 1. The light is adjusted up and down the pipe 8 by elevating the outer end of the lever 27 and sliding the block 25 to the desired position upon said pipe 8 and then depressing the outer end of said lever, thus causing the cushion 30 to yieldingly engage the pipe 8 and hold the block 25 in position.

It is obvious that a gas-light, an oil-lamp, or any desired form of light may be carried by the free end of the pipe 32. The portion 34 may be a flexible tube for conducting either gas or oil.

In Figs. 6 and 7 I show a construction which may be substituted for the chair-rail 15 and the bracket 14. The ears 35 and 36 are attached to the wall of the room in horizontal alinement, and the rod 37 is mounted with its ends in said ears. The sliding block 38 is mounted upon the rod 37, and the vertical bearing 39 is formed integral with said sliding block 38, and the lower end of the pipe 8 is inserted in said bearing 39 and held in position by means of the set-screw 40. The sliding block 38 is held adjustably in position upon the rod 37 by means of the set-screw 41. The rod 37 may or may not be tubular, as desired. By this construction the light may be adjusted laterally by moving the hook 9 laterally upon the picture-rail 13 and the block 38 laterally upon the rod 37. If there is no picture-rail 13 in the room, a rod similar to the rod 37 or other suitable device may be substituted for the picture-rail.

In the modification shown in Fig. 5 the strip of packing 42 is placed in the bearing through the block 25 and beside the pipe 8 and in position to be engaged by the lower end of the lever 27, and the upper end of the packing 42 is bent into a horizontal position against the upper face of the block 25 and is secured in position by means of a screw 43, inserted through said upper end and screw-seated in the block 25.

The object of either of the constructions shown in Figs. 3 or 5 is to prevent marring of the pipe 8 by the action of the lever 27.

I claim—

1. In an adjustable light, a vertical support, a block slidingly mounted upon said support, a lever carried by said block and engaging said support to hold said block adjustably in position, and a light attached to the outer end of said lever, the weight of said light operating the lever to engage the support, substantially as specified.

2. In an adjustable light, a vertical support mounted for lateral adjustment, a block slidingly mounted upon said support, a lever carried by said block and engaging said support to hold said block adjustably in position, and a light attached to the outer end of said lever, the weight of said light operating the lever to engage the support, substantially as specified.

3. In an adjustable light, a vertical support, a block slidingly mounted upon said support, a lever carried by said block and engaging said support to hold said block adjustably in position, suitable packing between the contacting faces of said lever and said support, and a light attached to the outer end of said lever, the weight of said light operating the lever to engage the support, substantially as specified.

4. In an adjustable light, a vertical support, a block slidingly mounted upon said support, a lever carried by said block and engaging said support to hold said block adjustably in position, a light attached to the outer end of said lever, the weight of said light operating the lever to engage said support, and a flexible conductor leading from said support to said light, substantially as specified.

In testimony whereof I affix my signature in presence of two witnesses.

FREDERICK A. LAVERCOMBE.

Witnesses:
EDWARD E. LONGAN,
MAUD GRIFFIN.